United States Patent
Lanz et al.

(10) Patent No.: US 10,154,577 B2
(45) Date of Patent: Dec. 11, 2018

(54) SYSTEM AND METHOD FOR AUTOMATED WELDING

(71) Applicant: Deloro Wear Solutions GmbH, Koblenz (DE)

(72) Inventors: Oliver Lanz, Koblenz (DE); Torsten Baum, Mendig (DE)

(73) Assignee: Deloro Wear Solutions GmbH (DE)

( * ) Notice: Subject to any disclaimer, the term of this patent is extended or adjusted under 35 U.S.C. 154(b) by 187 days.

(21) Appl. No.: 15/214,074

(22) Filed: Jul. 19, 2016

(65) Prior Publication Data

US 2017/0027050 A1 Jan. 26, 2017

Related U.S. Application Data

(60) Provisional application No. 62/194,362, filed on Jul. 20, 2015.

(51) Int. Cl.
*H05H 1/36* (2006.01)
*B23K 37/02* (2006.01)
(Continued)

(52) U.S. Cl.
CPC .............. *H05H 1/36* (2013.01); *B23K 9/028* (2013.01); *B23K 9/0216* (2013.01); *B23K 9/095* (2013.01);
(Continued)

(58) Field of Classification Search
CPC ........ H05H 1/36; H05H 1/42; B23K 37/0258; B23K 37/04; B23K 31/02; B23K 9/095;
(Continued)

(56) References Cited

U.S. PATENT DOCUMENTS

| 8,987,637 B1 * | 3/2015 | Messina ............... B23K 9/0216 |
| | | 219/121.13 |
| 2008/0245777 A1 | 10/2008 | Cremerius et al. |

(Continued)

FOREIGN PATENT DOCUMENTS

| DE | 102009046619 A1 | 5/2011 |
| DE | 102012021265 A1 | 4/2014 |

(Continued)

OTHER PUBLICATIONS

PCT International Search Report dated Jan. 10, 2017; filed in International Application No. PCT/IB2016/001182; 12 pgs.

*Primary Examiner* — Nathan L Laughlin
(74) *Attorney, Agent, or Firm* — Vedder Price P.C.

(57) ABSTRACT

The present application discloses a system and method for an automated or semi-automated welding operation with minimal input from an operator on a workpiece using a programmable logic controller (PLC) communicatively coupled to a non-transitive memory device and a welding machine. The present application uses the PLC to obtain information from a technical drawing stored in the memory device and default values of welding parameters for the welding operation. The PLC calculates a first rotational speed and performs the welding operation on the first portion of the workpiece based on the first instruction received from the PLC. If the welding parameters need to be adjusted during the welding operation, new welding parameters are obtained from the technical drawing and the PLC re-calculates a second rotational speed for the workpiece and performs the welding operation based on the second instruction received from the PLC.

21 Claims, 3 Drawing Sheets

(51) Int. Cl.
  *B23K 37/04* (2006.01)
  *G05B 19/05* (2006.01)
  *H05H 1/42* (2006.01)
  *B23K 9/02* (2006.01)
  *B23K 9/028* (2006.01)
  *B23K 9/095* (2006.01)
  *B23K 31/02* (2006.01)
  *B23K 26/082* (2014.01)
  *B23K 26/282* (2014.01)
  *B23K 101/06* (2006.01)

(52) U.S. Cl.
  CPC .......... *B23K 26/082* (2015.10); *B23K 26/282* (2015.10); *B23K 31/02* (2013.01); *B23K 37/0258* (2013.01); *B23K 37/04* (2013.01); *G05B 19/05* (2013.01); *H05H 1/42* (2013.01); *B23K 2201/06* (2013.01); *G05B 2219/45135* (2013.01)

(58) Field of Classification Search
  CPC .... B23K 9/028; B23K 26/082; B23K 26/282; B23K 9/0216; G05B 19/05
  See application file for complete search history.

(56) References Cited

U.S. PATENT DOCUMENTS

2014/0001168 A1\* 1/2014 Cole .................... B23K 9/1006
  219/130.51
2014/0091129 A1\* 4/2014 Peters ................. B23K 9/0284
  228/102

FOREIGN PATENT DOCUMENTS

GB    2106816 A    4/1983
JP    3795164 B2   7/2006

\* cited by examiner

SYSTEM AND METHOD FOR AUTOMATED WELDING

RELATED APPLICATIONS

The present application claims the benefit of U.S. Provisional Application No. 62/194,362 titled SYSTEM AND METHOD FOR AUTOMATED WELDING filed on Jul. 20, 2015.

FIELD OF THE DISCLOSURE

The present invention generally relates to a system and method for performing a welding using a semi-automated or automated welding machine.

BACKGROUND OF THE INVENTION

Welding is a process for joining materials (such as metals and thermoplastics) together through fusion. For example, to weld two metals together, a heat source may be applied to melt the base metals and fuse them together. A filler material may also be added to the joint between the two metals to strengthen the connection. Various types of welding processes, systems, and machines to join materials together are generally known. For example, two well-known, traditional welding processes are oxy-fuel welding ("OFW"), wherein a mix of fuel gasses and oxygen is used to produce the weld, and gas tungsten arc welding ("GTAW"), wherein a non-consumable tungsten electrode is used to produce the weld.

Some welding processes, known as welding overlays or cladding, may be used to apply metal to the surface of an object rather than to join two objects together. One such process is "hardfacing," wherein material is deposited onto a metallic surface or substrate of an object to change the properties of the object. For example, a harder or more resilient coating material can be applied to the surface of an object made from a weaker or less resilient base material to increase the strength or resilience of the object. Hardfacing may be done either to increase an object's wear resistance or to restore the surface of an object that has been worn down.

One example of a welding process used for hardfacing is plasma transferred arc ("PTA") welding. PTA welding is a versatile method which may be used to deposit high-quality metallurgically fused deposits on relatively low cost metallic surfaces. Soft alloys, medium and high hardness materials, and carbide composites can be deposited on a variety of substrates in order to achieve diverse properties including improved mechanical strength, wear and corrosion resistance, and decreased creep deformation (which is also referred to as "cold flow"). As a result, PTA welding has several significant advantages over traditional welding processes such as OFW and GTAW. PTA welding generally utilizes a lower heat input than traditional welding processes, allowing a thinner layer of deposit material to be used. Further, PTA welding can utilize powdered deposit material. This makes PTA welding significantly less expensive and more versatile than many traditional welding processes.

However, performing hardfacing using a process such as PTA welding (or even more traditional welding processes) requires that an operator possesses a significant amount of experience, skill, and judgment in order to perform the welding processes consistently and effectively. Hardfacing is most commonly done by hand; the operator must manually apply the filler material using a hand-held welding device. This requires that an operator possesses a significant level of skill, as the surface of the substrate constantly changes during the welding process and is generally uneven. As a result, performing hardfacing welding operations by hand often produces welds of variable width and thickness, potentially compromising the integrity of the weld over the lifespan of the part.

Occasionally, machines are used to perform a hardface welding process. Applying a weld overlay to a workpiece using a machine, as is necessary in performing a hardfacing welding process, requires an intimate understanding of the three-dimensional position and movement of the torch and the workpiece relative to one another. During the welding process, the heat source or torch must precisely move across the surface of the device and apply the correct amount of heat and filler material at every point. For a flat surface, the torch moves both laterally and longitudinally across the surface.

For a more complicated surface (such as a curved surface), this process is complicated further in that the part or substrate to which the welding process is being applied will generally need to be moved during the welding process in order to provide access to the entire surface to be hardfaced. This necessitates that the operator understand, and be able to accurately describe to the machine, the motion of the torch with reference to the moving workpiece. For example, for a cylindrical part, such as the workpiece or part 100 shown in FIG. 1, a hardface weld 106 may be applied circumferentially around a portion of the surface 102 of the part 100. Rather than moving the torch (not shown) around the workpiece 100, which requires complicated machinery, the workpiece 100 may be rotated while the torch only moves in the lateral direction x. The motion of the torch therefor must be described based on the rotation of the workpiece 100; the rotation of the workpiece 100 moves the torch in the longitudinal direction y along the surface 102 of the workpiece 100. Thus, in determining how to apply the weld overlay, the operator must not only calculate how to apply the overlay in three dimensions, but also account for the rotation of the workpiece 100 during the application of the overlay.

While various types of machines and devices have been created to assist with welding processes (such as computer numerical control or "CNC" welding devices), significant input and guidance is still required from the operator, creating the potential for significant error and raising the cost of the welding process. For example, to apply hardfacing to a cylindrical part, such as workpiece 100, using a known CNC welding device, the operator must define a variety of movement parameters in the CNC welding device's programming menu so that the CNC welding device will move the torch and part 100 in the desired manner. For a flat surface, these parameters include (i) the distance the torch moves in the lateral direction x (the oscillation width, or w); (ii) the speed at which the torch moves in the lateral direction x (the oscillation speed, or $V_o$); (iii) the speed at which the torch moves in the longitudinal direction y (the welding speed, or $V_s$); and (iv) the distance the torch moves in the longitudinal direction y for each oscillation (the pitch, or p). For a workpiece 100 with a curved surface, the operator must instead define the speed at which the workpiece 100 rotates (the rotational speed, or u). The operator will frequently need to calculate the rotational speed in dimensions that are difficult to visualize or understand, such as "degrees per minute" ("°/min"), based on the desired pitch and welding speed.

In order to obtain a precise hardfacing process, these settings must be calculated and entered correctly, which requires the operator to spend significant time double or triple-checking his or her work. Further, these settings are strongly depending on the particular geometry of a given workpiece. This requires the operator to accurately measure each individual workpiece and input new settings for each workpiece, or for each portion of a workpiece's surface with a different geometry. For example, separate sets of calculations are necessary for the first portion 102 and the second portion 104 of the workpiece 100 in FIG. 1, as the first and second portions have different diameters. Similarly, new calculations are required if the oscillation width is different for a particular portion of the welding process. If two or more variations occur between workpieces, it can be extremely difficult or impossible for an operator to adjust the new parameters so as to apply a consistent weld overlay between the workpieces, resulting in potentially significant variations in the hardfacing welds for the different workpieces. This is particularly problematic in manufacturing environments with tight tolerances.

Further, existing systems and methods of welding provide no opportunity for standardization of the welding process, resulting in a high failure risk, and require a highly educated welding operator. Such systems and methods provide less flexibility and greater complexity, as a variety of different welding procedure specifications ("WPSs") are required to account for the various types of physical geometries and welding characteristics that the welding operator will encounter.

Accordingly, there has been identified a need for an improved system and method for automated or machine-assisted welding that overcomes the limitations, shortcomings and disadvantages of known systems and methods.

BRIEF DESCRIPTION OF THE DRAWINGS

The following disclosure as a whole may be best understood by reference to the provided detailed description when read in conjunction with the accompanying drawings, drawing descriptions, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

DETAILED DESCRIPTION

The present invention relates to a system and method for automated welding. More particularly, the present invention is related to a computer or machine implemented method and related system and method for carrying out an automated or machine-assisted welding operation. The welding operation may be, by way of example and not limitation, a PTA welding operation or process or another type of hardfacing welding operation or process.

Existing Process for Machine-Assisted Hardfacing

Generally, machine-assisted hardfacing requires an operator to perform significant measurements on a workpiece, and calculations of preferred settings to be used during the welding operation, and then provide those calculations to the welding machine. Typically, this input is provided before the welding process begins, and adjustments during the welding process are not possible unless the process is stopped to permit the operator to perform additional measurements and calculations. This requirement that parameters be corrected manually (both during a single welding process and between welding processes—i.e., for each workpiece being processed) restricts the ability of the welding machine to utilize complex paths for travelling over the device and prohibits adjustments or corrections mid-process.

Figure 1:
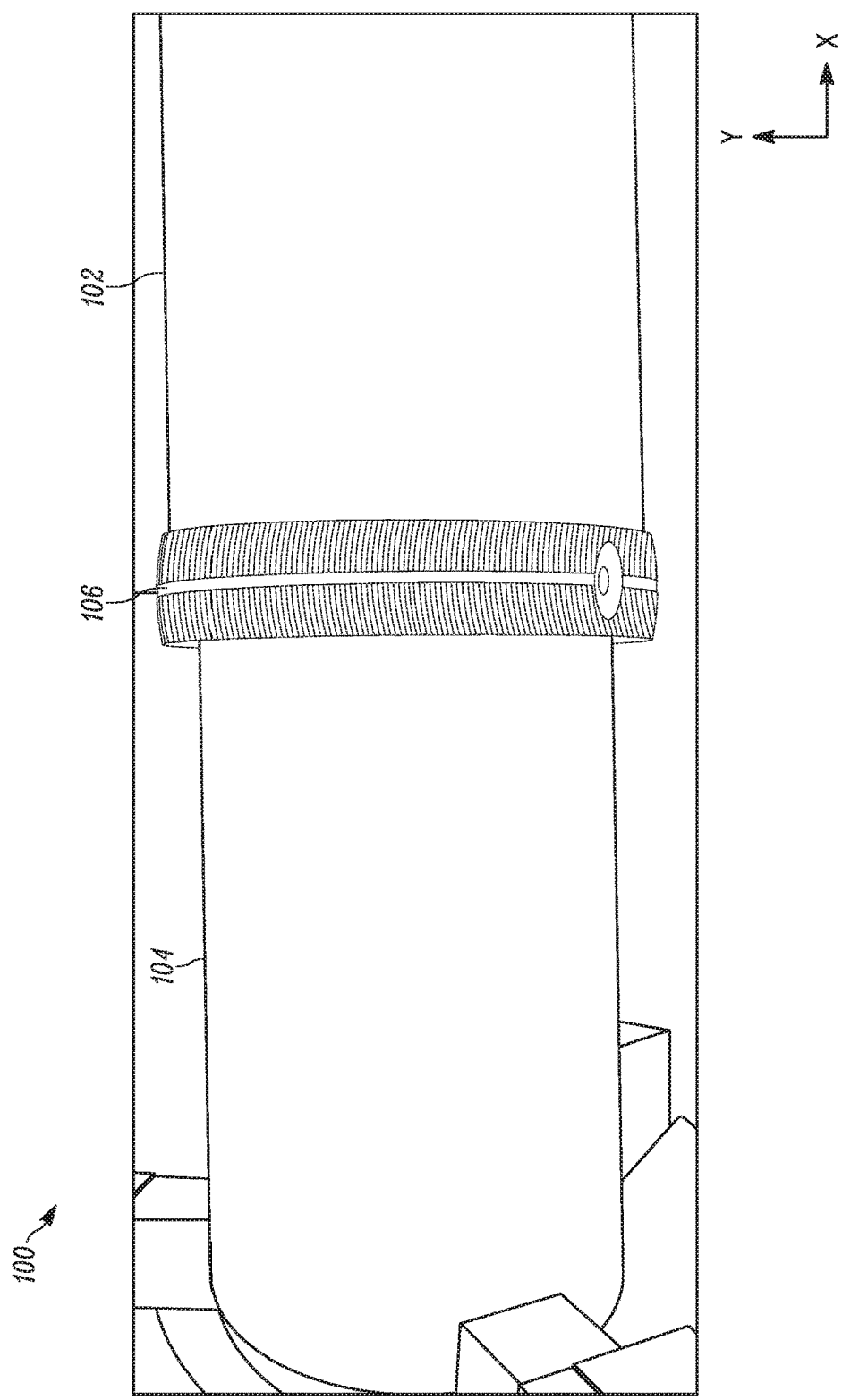
FIG. 1 is an image of a cylindrical part that has partially undergone a PTA welding operation.

With reference to FIG. 1, the following provides an example of a known process for performing a rotary hardfacing welding operation on a cylindrical part 100 using a machine, along with the various calculations and measurements that must be performed by the operator. As shown, the part 100 comprises a first portion 102 with a larger diameter than the second portion 104. A circumferential hardface weld 106 has already been applied along the first portion 102. In order to instruct the machine to perform the welding operation, the operator must begin by determining the physical geometry of the part 100. This includes determining the specific dimensions of the portion of the part 100 to be welded, such as the diameter of portion 102.

Figure 1A:
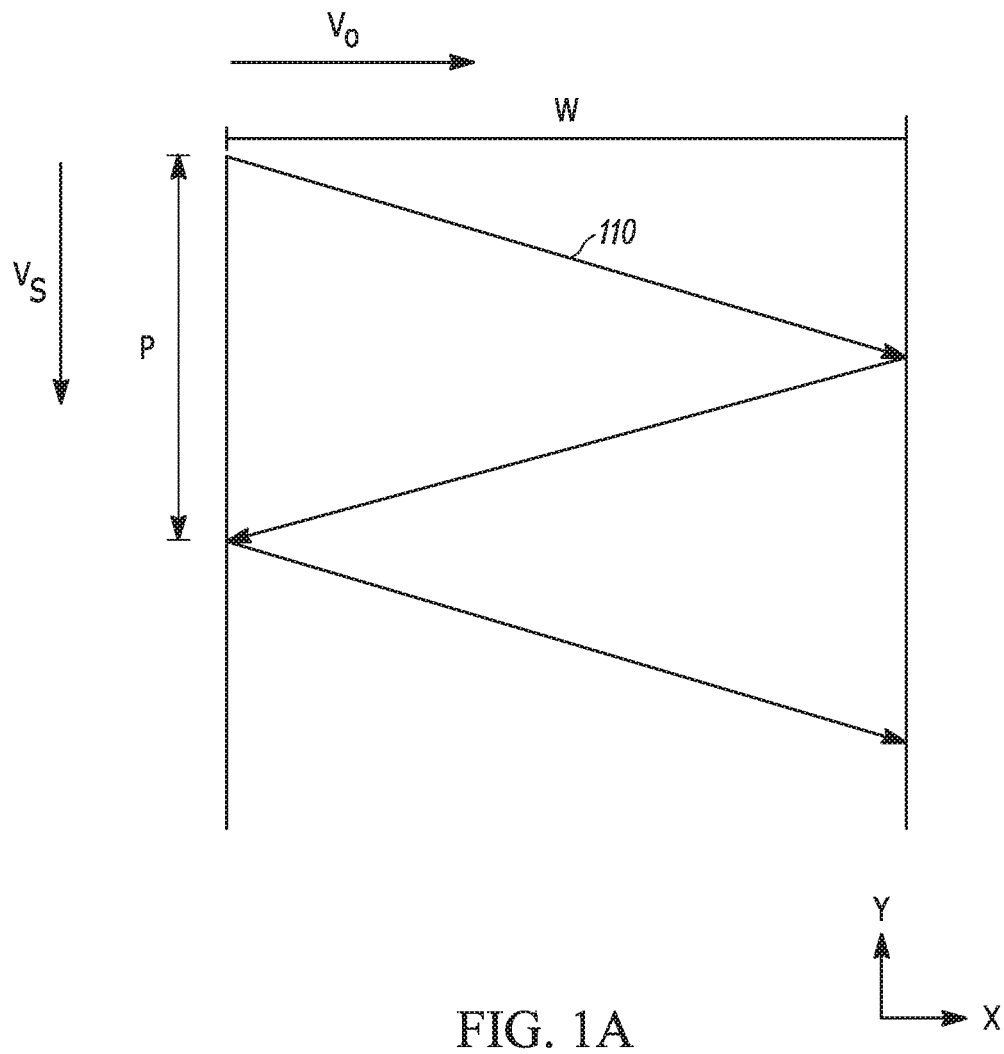
FIG. 1a is an illustration of the path of a torch during a welding operation.

Second, the operator must decide how to perform the welding operation. FIG. 1a depicts several of the parameters that must be specified by the operator in order to perform a hardface weld on a flat, two-dimensional surface. The path of the torch 110 along the surface 102 forms a series of triangles as the torch moves both in the lateral direction (x) and the longitudinal direction (y). The oscillation width (w) describes the lateral motion of the torch, while the pitch (p) describes the longitudinal motion. The torch also has a predefined speed in the lateral direction (Vo) and the longitudinal direction (Vs). When a part is rotated to perform the welding operation, such as for a cylindrical part 100, the operator must instruct the welding machine both how to move the torch across the surface of the part 100 and how to rotate the part 100. This requires that the operator instruct the machine regarding (i) the distance the torch will move in the lateral direction x (the oscillation width, or w); (ii) the speed at which the torch will move in the lateral direction x (the oscillation speed, or Vo); (iii) the speed at which the workpiece 100 will rotate (the rotational speed, or u) in order to provide the desired pitch (p) and welding speed ($V_s$); and (iv) the welding parameters, including the welding current, plasma gas flow rate, powder feed rate, etc., necessary to create the desired weld.

One example of how a welding machine may be able to calculate a rotational speed, based on the other inputs provided by the operator is described herein. The operator may set the following parameters (each of which can vary depending on the particular part 100 being welded and the desired characteristics for the weld) in order for the machine to perform the following calculations:

Parameters Set by the Operator
Oscillation width=30 mm
Oscillation speed=800 mm/min
Welding speed=35 mm/min
Part diameter=200 mm
Welding parameters (welding current, plasma gas flow rate, powder feed rate, etc.)
Calculation by the Machine
Rotational speed=20.1°/min
As discussed below, the rotational speed is selected based on the diameter of the part 100 and the chosen welding speed. The operator must calculate the rotational speed to give the desired welding parameters.

However, if one or more parameters set by the operator need to be changed, the other parameters need to be recalculated. For example, to keep the weld overlay constant, the operator must manually recalculate the rotational speed if the oscillation width is adjusted. Typically, the rotational speed is calculated in degrees per minute (°/min), a dimension that is difficult to visualize and work with. This also requires adjusting the welding parameters (such as the welding current, plasma gas rate, powder feed rate, etc.) to keep the thickness of the weld constant. Adjusting other parameters such as the welding speed or oscillation speed requires similar calculations. Further, for each new workpiece (or for each portion of a workpiece with a geometry that varies more than permitted by a set tolerance amount), the operator needs to calculate and enter completely new parameters, as the rotational speed depends on the diameter and the welding parameters depend on the rotational speed.

Process for Automated Welding

In an embodiment, an automated welding system and method are provided wherein the welding parameters are determined with minimal operator input. A new "zigzag" calculation is used to precisely determine the parameters necessary to perform a welding operation.

In one embodiment, a programmable logic controller ("PLC") is in communication with a welding machine, apparatus or system to carry out the method of the present disclosure. It will be appreciated that any other type of electronic or processor based device suitable for use may be utilized in accordance with aspects of the present disclosure.

One example of how the welding machine in conjunction with the PLC works is described herein. Rather than providing the automated welding system with all of the welding parameters, the operator merely specifies the pitch for the weld. By maintaining a constant pitch, the weld thickness is kept constant. In a preferred embodiment, the part geometry (i.e., the part diameter for a cylindrical part) is obtained by the system directly from the technical drawing. The automated welding system then calculates the other welding parameters as follows:

Parameters Set by the Operator
Pitch (p)=2.7 mm
Parameters Set by the Machine
Oscillation width (w)=30 mm (variable, with default value)
Oscillation speed (Vo)=800 mm/min (variable, with default value)
Part diameter (D)=200 mm (obtained from technical drawing)
Calculation by the Machine
Rotational speed $$(Vs) = \frac{180 * Vo * P}{\pi * D * w}$$

or pitch $$(P) = \frac{\pi * u * D * w}{180 * Vo}$$

During the welding operation, the pitch is held constant. Typically, the oscillation width and part diameter are also constant during a particular operation. The system varies the rotational speed (and, if necessary, the variable parameters such as the oscillation speed) so as to maintain the constant pitch. If any of the parameters (including the pitch, oscillation width, or part diameter) must be adjusted, the operator merely needs to input the necessary information and the system automatically recalculates the rotational speed and other welding parameters as necessary. In an embodiment, the oscillation width is determined based on a default value. In an alternative embodiment, the operator may input a desired oscillation width.

Figure 2:
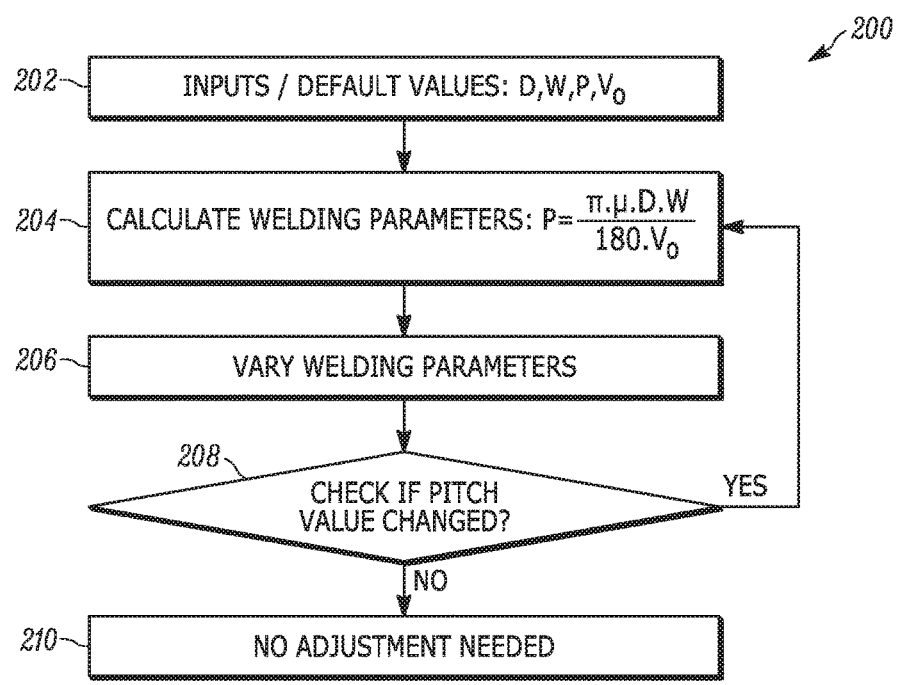
FIG. 2 is a flow chart illustrating a process flow in accordance with an embodiment of the present disclosure.

A flow chart illustrating the calculations performed by the automated system is provided as FIG. 2. The process 200 begins at step 202 when the system loads in the initial parameters, including the part diameter, pitch, oscillation width, and welding speed. As discussed above, in an embodiment, the part diameter is obtained directly from a technical drawing. In an alternative embodiment, the part diameter is measured automatically by the system or it is provided by the operator. The operator provides the desired pitch and oscillation width. The welding speed is a default value that may be adjusted if necessary (i.e., to avoid an excessive rotational speed). Default values may also be used for other welding parameters, such as the welding current, plasma gas flow rate, powder feed rate, etc., based on the default value for the welding speed. Next, at step 204, the rotational speed is calculated automatically based on the input parameters obtained at step 202. The welding process then begins using the calculated rotational speed. If the welding parameters need to be adjusted during the welding process or after one phase of the welding process is completed, new welding parameters are obtained at step 206. For example, a new part diameter may be obtained from the technical drawing as the welding processes advance to a new section of the part. At step 208, the system then checks if using the new parameters will change the desired pitch value. If so, the system returns to step 204 and recalculates the rotational speed so as to keep the pitch constant. The rotational speed has an inverse relationship with the oscillation width and part diameter and a direct relationship with the welding speed. For example, if the oscillation width is increased, the rotational speed will decrease. Similarly, if the part diameter is increased, the rotational speed is decreased. If the pitch is unchanged, the system advances to step 210 and refrains from adjusting the welding parameters.

Figure 3:
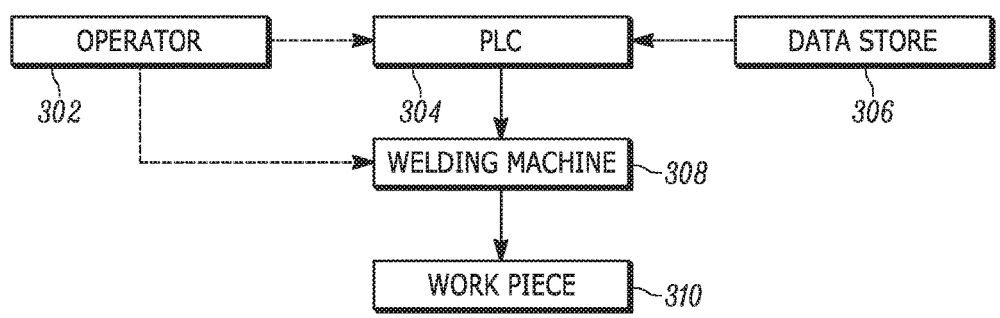
FIG. 3. is a block diagram in accordance with an embodiment of the present disclosure.

As shown in FIG. 3, in an embodiment, the improved automated welding system and method are configured such that data is directly from a technical drawing for a part in order to use the data in calculating the parameters for the welding process without requiring the operator to determine welding parameters. The technical drawing may be stored in a memory device that is communicatively coupled to the PLC. The operator 302 provides the desired pitch to the PLC 304. As will be understood by those skilled in the art, the operator 302 is not necessarily in communication with either the PLC 304 or the welding machine 308 during the welding process, but instead merely provides input as needed for a particular operation. The PLC then loads default values for the oscillation width and welding speed from the data store 306, along with the part diameter obtained from the technical drawing. The operator 302 mounts the workpiece 310 such that the welding machine 308 may perform the welding operation. After calculating the rotational speed and other welding parameters, the PLC 304 controls the welding machine 308 so as to carry out the welding operation on the workpiece 310. As will be understood by those skilled in the art, the operator 302 is not necessarily in communication with either the PLC 304 or the welding machine 308 during the welding process, but instead merely provides input as needed for a particular operation.

The PLC 304 may comprise a processor operatively connected to a memory or data store 306 and an input device configured to load data (such as dimensions) from the memory or data store 306 (which may contain, for example, a technical drawing for the workpiece 310) and use the data in performing calculations. The PLC 304 may also obtain other default values for welding parameters from the memory or data store 306. In an alternative embodiment, the PLC 304 is configured to permit the operator 302 to manually input the dimensions of a part or other welding parameters.

Laser Path Tracking

In an embodiment, the PLC 304 is operatively connected to a sensor (such as a laser distance finder) to determine the part diameter. The PLC 304 measures the precise part diameter at the location the weld operation will be performed and uses that diameter to calculate the necessary rotational speed.

In an embodiment, the sensor is used to track the path of the weld during the welding operation. For example, the sensor may be used to locate extruder screws (which must fall outside the weld) and adjust the oscillation width during the welding operation so as to avoid welding over the screws while maintaining a constant pitch. As such, the weld can remain centered and have a constant pitch while the oscillation width varies as necessary. In an embodiment, the oscillation width is varied based on information obtained from the technical drawing regarding the location of surface features or points that should be avoided during the welding process.

Complex Welding Paths

In an embodiment, the automated welding system is configured to weld complex, three-dimensional paths by moving the torch on elliptical paths with independent oscillation. Based on information regarding the specific physical geometry of a workpiece (provided, for example, by the operator or obtained from a technical drawing or using a sensor to measure the surface of the workpiece), the PLC 304 automatically determines how to rotate the workpiece and move the torch so as to maintain the pitch entered by the operator.

For example, the automated welding system may be used to perform a hardfacing weld on a triple-offset butterfly valve. The seat of the valve is built by two elliptical lines/edges. This leads to a non-symmetric seat, as the seat width varies per degree angle and the seat angle varies as well. For PTA welding, the liquid melt pool always has to remain in horizontal position, necessitating that the valve body is tilted while being rotated. Tilting the workpiece requires that the height and longitudinal position of the torch be moved (rather than merely lateral motion) so as to follow the seat. In order to perform this complex movement without requiring significant calculations from the operator, the PLC 304 is configured to permit the operator to input the starting and ending points of the weld and the desired pitch, along with the workpiece geometry (which may be obtained from the technical drawing). The PLC 304 then interpolates between the starting and ending points and adjusts the oscillation width and the rotational speed so as to perform the welding process.

This calculation may be performed using a "master-slave" relationship between the various axes of movement. The rotary axis is the master axis; as the workpiece is rotated, the workpiece is moved along other axes to account for the necessary rotation. For example, in the case of the triple-offset butterfly valve, the PLC determines the rotary position and then calculates a new tilting axis, along with the time at which the tiling movement must be completed. Similar calculations are performed for the height and lateral position of the torch.

The presently disclosed automated welding system and method provide numerous advantages over the prior art welding machines. First, an operator can conduct trial welding processes on a two-dimensional plate to ensure the weld has the desired characteristics. The operator can then create an identical weld on a workpiece with a complicated geometry (such as cylindrical workpiece 100) without needing to calculate the welding parameters; only the desired pitch is required. Second, this enables operators to quickly perform welding operations on workpieces with variable geometries, such as complex triple-offset butterfly valves which typically have variable seat widths requiring dramatically different welding parameters. Once the technical drawing is loaded into the PLC, the PLC automatically adjusts the rotational speed and other parameters so as to maintain a constant pitch (and thus a constant weld thickness). Third, consistent and standard welding parameters (such as welding current, plasma gas flow rate, powder feed rate, etc.) may be used, further increasing the uniformity of the welds. Even if the operator is forced to adjust the oscillation width (which may require new welding parameters, such as welding current, plasma gas flow rate, powder feed rate, etc.), the operator does not need to recalculate the rotational speed as this is automatically adjusted by the PLC so as to maintain a constant pitch.

Whereas particular aspects of this invention have been described above for purposes of illustration, it will be evident to those skilled in the art that numerous variations of the details of the present invention may be made without departing from the invention.

The invention claimed is:

1. A method for performing a welding operation on a workpiece using a programmable logic controller that is communicatively coupled to a non-transitive memory device and a welding machine, the method comprising:
   obtaining, by the programmable logic controller, a dimension (D) of the workpiece to be welded from a technical drawing stored in the memory device;
   obtaining, by the programmable logic controller, one or more default values for a plurality of welding parameters for the welding operation from the memory device, wherein the plurality of welding parameters comprise an oscillation width (w) and an oscillation speed (Vo);
   obtaining, by the programmable logic controller, a pitch (P) for the welding operation;
   calculating, by the programmable logic controller, a first rotational speed ($V_s$) for the workpiece during a first portion of the welding operation;
   performing, with the welding machine, the first portion of the welding operation using the first rotational speed based on a first instruction received from the programmable logic controller;
   obtaining, by the programmable logic controller, a new value for at least one of the group consisting of the oscillation width, the oscillation speed, and the dimension using information from the technical drawing stored in the memory device, wherein the new value is used during a second portion of the welding operation;
   calculating, by the programmable logic controller, a second rotational speed for the workpiece during the second portion of the welding operation using the new value, wherein the pitch is maintained as constant; and performing, with the welding machine, the second portion of the welding operation using the second rotational speed based on a second instruction received from the programmable logic controller.

2. The method of claim 1, wherein the workpiece is substantially cylindrical and the first rotational speed and the second rotational speed is calculated using the formula:

$$(V_S) = \frac{180 * V_o * P}{\pi * D * w}.$$

3. The method of claim 1, wherein the programmable logic controller is communicatively coupled to a sensor configured to obtain a plurality of measurements of the workpiece, the method further comprising the step of obtaining, by the programmable logic control, the plurality of measurements of the workpiece from the sensor.

4. The method of claim 3, wherein the sensor comprises a laser distance finder.

5. The method of claim 3, further comprising the step of using, by the programmable logic controller, the plurality of measurements to confirm the dimension obtained from the technical drawing is correct.

6. The method of claim 3, further comprising the step of using, by the programmable logic controller, the plurality of measurements to determine a new value for the dimension after completing the first portion of the welding operation.

7. The method of claim 3, wherein the sensor obtains the plurality of measurements continuously during the welding operation, the method further comprising the step of using, by the programmable logic controller, the plurality of measurements to continuously recalculate the second rotational speed during the welding operation.

8. The method of claim 7, further comprising the step of using, by the programmable logic controller, the plurality of measurements to continuously update the dimension during the welding operation.

9. The method of claim 7, further comprising the step of using, by the programmable logic controller, the plurality of measurements to locate a surface feature on the workpiece and update the oscillation width during the welding operation.

10. The method of claim 3, wherein the welding machine comprises a torch and is configured to move the torch in at least two perpendicular dimensions, the method further comprising the steps of:
determining, by the programmable logic controller, a first location of the torch in reference to the workpiece during the first portion of the welding operation based on the plurality of measurements;
determining, by the programmable logic controller, a second location for the torch during the second portion of the welding operation;
moving the torch, with the welding machine, to the second location based on a third instruction received from the programmable logic controller prior to beginning the second portion of the welding operation.

11. The method of claim 10, wherein the programmable logic controller determines the second location based at least in part on the second rotational speed.

12. A system for performing a welding operation on a workpiece, the system comprising:
a processor communicatively coupled to a non-transitive memory, a welding machine configured to operate on the workpiece, and an input device, wherein the memory contains a program configured to call the processor to execute the steps of:
obtaining a dimension (D) of the workpiece to be welded from a technical drawing stored in the memory;
obtaining one or more default values for a plurality of welding parameters for the welding operation from the memory device, wherein the plurality of welding parameters comprise an oscillation width (w) and an oscillation speed (Vo);
obtaining a pitch (P) for the welding operation from the input device;
calculating a first rotational speed (Vs) for the workpiece during a first portion of the welding operation;
performing the first portion of the welding operation on the workpiece using the welding machine, wherein the first portion of the welding operation uses the rotational speed;
obtaining, from the input device, a new value for at least one of the group consisting of the oscillation width, the oscillation speed, and the dimension using information from the technical drawing stored in the memory device, wherein the new value is used during a second portion of the welding operation;
calculating a second rotational speed for the workpiece during the second portion of the welding operation using the new value wherein the pitch is maintained as constant; and
performing the second portion of the welding operation with the welding machine using the second rotational speed.

13. The system of claim 12, wherein the workpiece is substantially cylindrical and the program is configured to call the processor to calculate the first rotational speed and the second rotational speed using the formula:

$$(V_S) = \frac{180 * V_o * P}{\pi * D * w}.$$

14. The system of claim 12, wherein the system further comprises a sensor communicatively coupled to the processor and the program is configured to call the processor to obtain a plurality of measurements of the workpiece from the sensor.

15. The system of claim 14, wherein the sensor comprises a laser distance finder.

16. The system of claim 14, wherein the program is configured to call the processor to confirm the dimension obtained from the technical drawing is correct using the plurality of measurements.

17. The system of claim 14, wherein the program is configured to call the processor to determine a new value for the dimension after completing the first portion of the welding operation based on the plurality of measurements.

18. The system of claim 14, wherein the program is configured to call the processor to obtain the plurality of measurements from the sensor continuously during the welding operation and continuously recalculate the second rotational speed during the welding operation based on the plurality of measurements.

19. The system of claim 18, wherein the program is configured to call the processor to continuously update the dimension during the welding operation using the plurality of measurements.

20. The system of claim 18, wherein the program is configured to call the processor to locate a surface feature on the workpiece based on the plurality of measurements and update the oscillation width during the welding operation.

21. The system of claim 14, wherein the welding machine comprises a torch and is configured to move the torch in at least two perpendicular dimensions and the program is configured to call the processor to execute the additional steps of:
- determining a first location of the torch in reference to the workpiece during the first portion of the welding operation based on the plurality of measurements;
- determining a second location for the torch during the second portion of the welding operation;
- moving the torch to the second location prior to beginning the second portion of the welding operation.

* * * * *